(12) United States Patent
Maki

(10) Patent No.: US 8,461,726 B2
(45) Date of Patent: Jun. 11, 2013

(54) WIRE HARNESS AND ECU SYSTEM

(75) Inventor: Youichi Maki, Kosai (JP)

(73) Assignee: Yazaki Corporation, Tokyo (JP)

( * ) Notice: Subject to any disclaimer, the term of this patent is extended or adjusted under 35 U.S.C. 154(b) by 860 days.

(21) Appl. No.: 12/575,793

(22) Filed: Oct. 8, 2009

(65) Prior Publication Data

US 2010/0088004 A1 Apr. 8, 2010

(30) Foreign Application Priority Data

Oct. 8, 2008 (JP) .................................. 2008-261879
Feb. 9, 2009 (JP) .................................. 2009-027520

(51) Int. Cl.
*H01B 7/30* (2006.01)

(52) U.S. Cl.
USPC ........................................................ 307/147

(58) Field of Classification Search
USPC ........................................................ 307/147
See application file for complete search history.

(56) References Cited

U.S. PATENT DOCUMENTS

| | | | |
|---|---|---|---|
| 4,081,879 A * | 4/1978 | Rubright | 16/2.2 |
| 7,572,149 B2 | 8/2009 | Matsuura et al. | |
| 7,744,425 B2 | 6/2010 | Shimizu | |
| 2004/0152358 A1 * | 8/2004 | Huber et al. | 439/505 |
| 2004/0212965 A1 | 10/2004 | Ishii et al. | |
| 2008/0200048 A1 | 8/2008 | Matsuura et al. | |
| 2009/0017653 A1 | 1/2009 | Shimizu | |

FOREIGN PATENT DOCUMENTS

| | | |
|---|---|---|
| JP | 2002-315152 A | 10/2002 |
| JP | 2003-254809 A | 9/2003 |
| JP | 2003-291753 A | 10/2003 |
| JP | 2004-281722 A | 10/2004 |
| JP | 2006-107809 A | 4/2006 |
| JP | 2007-282322 A | 10/2007 |
| JP | 2008-105577 A | 5/2008 |
| JP | 2008-226809 A | 9/2008 |
| JP | 2009-22097 A | 1/2009 |

OTHER PUBLICATIONS

Office Action dated Apr. 2, 2013 issued by the Japanese Patent Office in counterpart Japanese Patent Application No. 2009-027520.

* cited by examiner

*Primary Examiner* — Robert L. Deberadinis
(74) *Attorney, Agent, or Firm* — Sughrue Mion, PLLC

(57) ABSTRACT

A wire harness is provided to include: one or more electric wires; and an ECU which includes a circuit body electrically connected to one ends of the one or more electric wires and a sealing member that seals the circuit body and the one ends of the one or more electric wires. The one ends of the one or more electric wire are electrically connected to at least one of a power line pattern, a GND line pattern and a signal line pattern of the circuit body.

14 Claims, 11 Drawing Sheets

WIRE HARNESS AND ECU SYSTEM

BACKGROUND OF THE INVENTION

1. Technical Field

The present invention relates to a wire harness connected to an electronic control unit (refer it to as an ECU, hereinafter) that electronically controls a load and various kinds of other devices (refer them together as "electrical equipments", hereinafter) mounted on a vehicle, and an ECU system that electrically connects the ECU to the various kinds of electrical equipments.

2. Background Art

Usually, an ECU for carrying out various kinds of controls of a vehicle has been known. As a device using the ECU, an ECU-mount box is proposed which is mounted on the vehicle under a state that an ECU case having the ECU incorporated is attached thereto. For instance, JP-A-2008-105577 proposes the ECU-mount box. In the ECU-mount box, under a state that the weight of a box main body having an ECU case and its stand-by connector accommodated therein is reduced and miniaturized, a strength necessary for the box main body with the stand-by connector incorporated can be ensured and the reliability of an attachment is improved (for instance, see JP-A-2008-105577).

A wire harness is used to electrically connect a battery to the ECU or the ECU to the electrical equipments. However, the treatments of the ECU and the wire harness by a worker for an assembly work have been hitherto completely different from each other.

Namely, for instance, even when the wire harness is allowed to contact a surface on which a wiring is arranged during an arrangement thereof, the quality of the wire harness is hardly affected thereby. Accordingly, the wire harness is liable to be treated disorderly by the worker for the assembly work. On the other hand, when the ECU is handled disorderly during a work, since there is a fear that the quality as the ECU may be greatly adversely affected, for instance, a casing for holding the ECU is broken or wirings of a circuit body disposed in the casing of the ECU are disconnected, the ECU needs to be handled carefully by the worker for the assembly work. Such a difference in treatment results from a fact that the wire harness and the ECU are formed as separate members and the ECU is held by the casing (for instance, made of plastic) whose resistance to an impact may not be sufficient.

In an assembly line in which the ECU and the wire harness are formed as the separate members and the ECU is connected to the wire harness in a part of works of production processes, when the ECU and the wire harness are connected and arranged together, below described problems arise due to a preconception that the ECU and the wire harness are handled as the separate members. Namely, (1) As described above, the worker for the assembly work needs to be conscious of the treatments of the ECU and the wire harness and carry out different treatments.

(2) By considering a connection of the ECU and the wire harness by a manual operation of the worker for the assembly work, for instance, as shown in FIG. 11, a connector 201 needs to be formed in a casing 200A of the ECU 200 side to fit a connector 101 attached to one end of the wire harness 100 thereto. However, the connector 201 of the ECU 200 side is required to have such a size as to improve workability when the ECU 200 is connected to the wire harness 100. As a result, it is difficult to miniaturize the casing 200A of the ECU 200. Further, in order to allow the ECU 200 to have a durability to an impact, the casing 200A of the ECU 200 needs to be enlarged to some degree, which prevents the casing of the ECU from being miniaturized.

(3) When the ECU is enlarged, the arrangement of wirings needs to be designed by considering where the ECU is to be suitably arranged. Accordingly a degree of freedom in designing the arrangement of wirings is lowered.

SUMMARY OF THE INVENTION

The present invention is proposed by considering the above-described circumstances, and it is an object of the present invention to provide a wire harness and an ECU system in which a worker for an assembly work can treat an ECU in the same manner as that of the wire harness and the ECU can be miniaturized.

In order to achieve the object, the present invention provides the following configurations (1) to (6).

(1) A wire harness includes: one or more electric wires; and an ECU which includes a circuit body electrically connected to one ends of the one or more electric wires and a sealing member that seals the circuit body and the one ends of the one or more electric wires, and the one ends of the one or more electric wire are electrically connected to at least one of a power line pattern, a GND line pattern and a signal line pattern of the circuit body.

(2) The wire harness may be configured so that the ECU further includes a connecting part electrically connected to the one or more electric wires and sealed with the sealing member.

(3) The wire harness may be configured so that the ECU includes a fixing unit for fixing the ECU to a member to be fixed, the fixing unit sealed with the sealing member.

(4) The wire harness may be configured so that the fixing unit has a part sealed with the sealing member.

(5) The wire harness may be configured so that the ECU includes a holding unit for fixing and holding another electric wire which differs from the electric wire, the holding unit sealed with the sealing member.

(6) The wire harness may be configured so that the holding unit has a part sealed with the sealing member.

According to the wire harness of the above-described structure of (1), the worker for the assembly work can treat the ECU and the wire harness in the same manner. Namely, a cautious (careful) treatment for avoiding the damage of the ECU is not necessary and the miniaturization of the ECU can be realized.

According to the wire harness of the above-described structure of (2), since the connecting part is electrically connected to the one end of the electric wire and sealed with the sealing member, a cautious (careful) treatment for avoiding the damage of the ECU is not necessary and the miniaturization of the ECU can be realized.

According to the wire harness of the above-described structure of (3), even when exclusive parts are not separately prepared nor used, the ECU can be simply fixed to a member to be fixed by using a fixing unit provided integrally with the ECU.

According to the wire harness of the above-described structure of (4), when the fixing unit is attached to the wire harness, since the fixing unit does not need to be fixed thereto by an adhesive agent, the number of processes and a cost can be reduced.

According to the wire harness of the above-described structure of (5), even when exclusive parts are not separately prepared nor used, an electric wire can be simply held by a holding unit provided integrally with the ECU.

According to the wire harness of the above-described structure of (6), when the holding unit is attached to the wire harness, since the holding unit does not need to be fixed thereto by an adhesive agent, the number of processes and the cost can be reduced.

Moreover, in order to achieve the object, the present invention provides the following configurations (7) to (12).

(1) An ECU system includes: a master ECU; a slave ECU electrically connected to the master ECU through an electric wire of a first wire harness; and an electrical equipment electrically connected to the slave ECU through an electric wire of a second wire harness. The slave ECU includes: a slave circuit body; a slave sealing member that seals the slave circuit body, one end of the electric wire of the first wire harness and one end of the electric wire of the second wire harness under a state that the one end of the electric wire of the first wire harness and the one end of the electric wire of the second harness are electrically connected to at least one of a power line pattern, a GND line pattern and a signal line pattern of the slave circuit body; and a current limiter that lowers a current supplied through the electric wire of the first wire harness from the master ECU to a prescribed current value suitable for the electrical equipment and supplies the lowered current to the electrical equipment through the electric wire of the second wire harness, and the electric wire of the first wire harness is smaller in diameter than the electric wire of the second wire harness.

(8) The ECU system may be configured so that the master ECU includes: a master circuit body; and a master sealing member that seals the master circuit body and the other end of the electric wire of the first wire harness under a state that the other end of the electric wire of the first wire harness is electrically connected to at least one of a power line pattern, a GND line pattern and a signal line pattern of the master circuit body.

(9) The ECU system may be configured so that the master ECU and/or the slave ECU includes integrally a fixing unit that fixes the master ECU and/or the slave ECU to a member to be fixed.

(10) The ECU system may be configured so that the fixing unit has a part formed integrally with the master ECU and/or the slave ECU.

(11) The ECU system may be configured so that the master ECU and/or the slave ECU includes integrally a holding unit that fixes and holds another electric wire which differs from the electric wires of the first and second wire harnesses.

(12) The ECU system may be configured so that the holding unit has a part formed integrally with the master ECU and/or the slave ECU.

According to the ECU system of the above-described structure of (7), the worker for the assembly work can treat a slave ECU and the wire harness in the same manner. Namely, a cautious (careful) treatment for avoiding the damage of the slave ECU is not necessary and the miniaturization and light weight of the slave ECU can be realized.

Further, according to the ECU system of the above-structure of (8), the worker for the assembly work can treat a master ECU and the wire harness in the same manner. Namely, a cautious treatment for avoiding the damage of the master ECU is not necessary and the miniaturization and light weight of the master ECU can be realized.

According to the ECU system of the above-described structure of (9), even when exclusive parts are not separately prepared nor used, the master ECU and/or the slave ECU can be simply fixed to a member to be fixed by using a fixing unit provided integrally with the master ECU and/or the slave ECU.

Further, according to the ECU system of the above-described structure of (10), when the fixing unit is attached to the master ECU and/or the slave ECU, the fixing unit does not need to be fixed thereto by an adhesive agent, the number of processes and a cost can be reduced.

Further, according to the ECU system of the above-described structure of (11), even when exclusive parts are not separately prepared nor used, an electric wire can be fixed and held by a holding unit provided integrally with the master ECU and/or the slave ECU.

Further, according to the ECU system of the above-described structure of (12), when the holding unit is attached to the master ECU and/or the slave ECU, since the holding unit does not need to be fixed thereto by an adhesive agent, the number of processes and the cost can be reduced.

According to the present invention, the ECU and the wire harness do not need to be separately treated. Namely, a cautious (careful) treatment for avoiding the damage of the ECU is not necessary and the worker for the assembly work can treat the ECU and the wire harness in the same manner. Thus, workability during the transportation and the arrangement of a wiring is improved. Further, since the ECU is miniaturized and has a sufficient durability for an impact, a work such as transportation is easily carried out.

The present invention is briefly described above. Further, a detail of the present invention will be more apparent by reading below-described exemplary embodiments for carrying out the present invention with reference to the attached drawings.

DETAILED DESCRIPTION OF THE PREFERRED EMBODIMENTS

Figure 1:
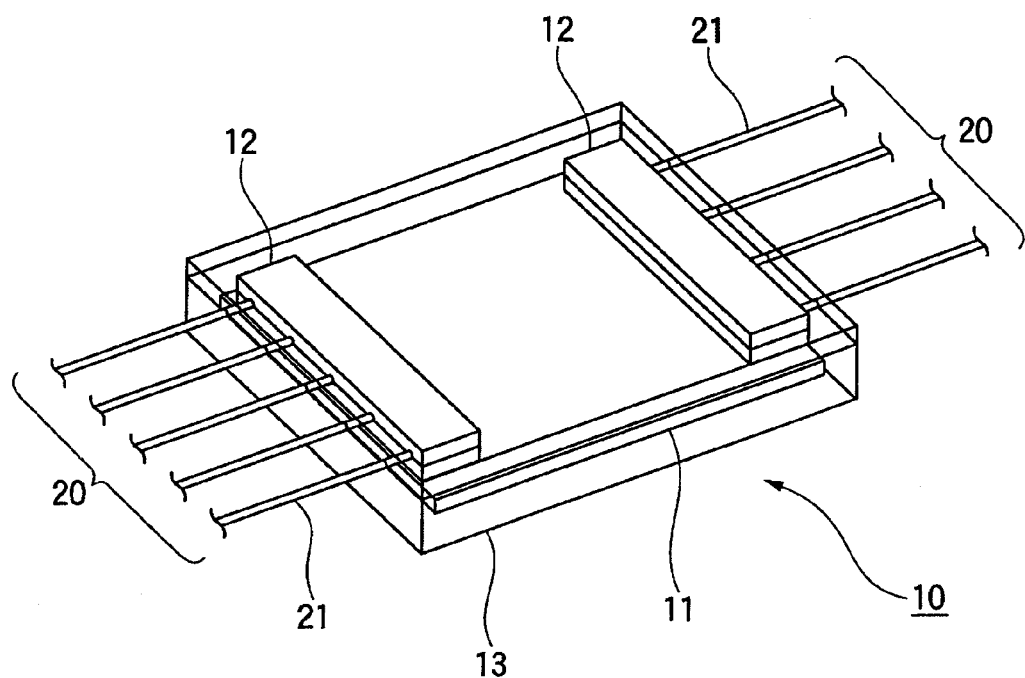
FIG. 1 is a structural diagram showing main parts of a wire harness and an ECU according to a first exemplary embodiment of the present invention.

Exemplary embodiments of the present invention will be described by referring to the drawings.

First Exemplary Embodiment

FIG. 1 shows a wire harness 20 to which an ECU 10 according to a first exemplary embodiment is connected. The ECU 10 includes a circuit body 11, connecting parts 12 as members for electrically connecting one ends of electric wires 21 of the wire harness 20 to a power line pattern, a GND line pattern or a signal line pattern of the circuit body 11 (illustrations of the power line pattern, the GND line pattern and the signal line pattern are omitted in FIG. 1, however, they are provided on the upper surface of the circuit body 11) and a sealing member 13 that seals the circuit body 11 and the one ends of the electric wires 21 of the wire harness 20 under a state that the one ends of the electric wires 21 of the wire harness 20 are electrically connected to the power line pattern, the GND line pattern or the signal line pattern of the circuit body 11.

The circuit body 11 is formed with an electronic circuit board and the power line pattern, the GND line pattern or the signal line pattern on the electronic circuit board comes into contact with conductor parts of the connecting parts 12, so that the circuit body 11 is electrically conducted to the connecting parts 12.

The connecting parts 12 are connectors directly attached to the circuit board and including metal members that are directly attached to the signal pattern or the GND pattern of the circuit body 11 by a solder. To the connectors directly attached to the circuit board, the one ends of the electric wires 21 of the wire harness 20 are electrically connected. Accordingly, the power line pattern, the GND line pattern or the signal line pattern of the circuit body 11 is electrically connected to the one ends of the electric wires 21 of the wire harness 20 through the connectors directly attached to the circuit board.

The sealing member 13 seals the circuit body 11 and the one ends of the electric wires 21 of the wire harness 20 with the connecting parts 12 so as to accommodate the circuit body 11 and the one ends of the electric wires 21 of the wire harness 20 therein. For the sealing member 13, may be used, for instance, a hot melt mold, an epoxy resin, an acrylic ultraviolet ray solidified rein, a silicone resin and other suitable insulating resins.

Figure 11:
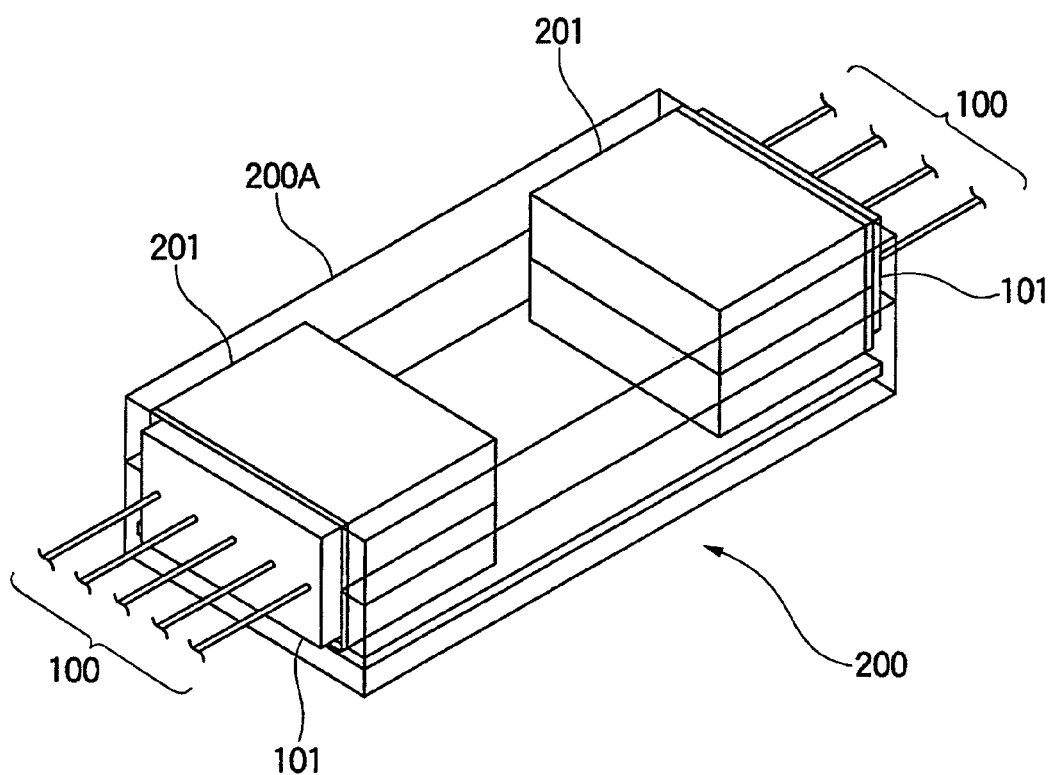
FIG. 11 is a structural view showing a usual ECU.

In this structure, since the wire harness 20 is formed integrally with the circuit body 11, connectors attached to a circuit board (see reference numeral 201 of FIG. 11) to which wire connectors (see reference numerals 101 of FIG. 11) provided in one ends of electric wires of a usual wire harness are fitted do not need to be provided in a part forming an outline of the ECU 10. That is, in this exemplary embodiment, a casing can be miniaturized more by the size of the connectors attached to the circuit board than the casing of a usual ECU at the minimum.

Usually, when the ECU is connected to the wire harness, they are connected together by a manual operation. In this case, in order to improve workability, the connectors attached to the circuit board need to have a certain size. However, in the present invention, the circuit body 11 of the ECU 10 is not connected to the wire harness 20 through the connectors, but the ends of the electric wires 21 of the wire harness 20 are integrally fixed to the circuit body 11 of the ECU 10 under a state that the ends of the electric wires 21 of the wire harness 20 are electrically connected to the circuit body 11 the ECU 10 through the connecting parts 12. Further, the circuit body 11 of the ECU and the ends of the electric wires 21 of the wire harness 20 are sealed with the sealing member 13. Accordingly, since the ECU and the wire harness formed in the above-described state are arranged by a worker, the miniaturization of the ECU can be promoted without considering the workability of the manual operation when the ECU is connected to the wire harness.

In the present invention, since the circuit body 11 of the ECU 10 and the ends of the electric wires 21 of the wire harness 20 are coated with the sealing member 13 as described above, the durability of the ECU 10 to an external impact can be ensured. Therefore, a device having the circuit body 11 of the ECU 10 connected to the ends of the electric wires 21 of the wire harness 20 in the present invention may be handled without requiring a careful treatment as in a usual device in which the wire harness is disorderly handled. As a result, the worker does not need to consider a treatment for each ECU and for each wire harness and may treat the ECU and the wire harness as the worker treats the wire harness to the end.

In the first exemplary embodiment of the present invention, the structure is described that the power line pattern, the GND line pattern or the signal line pattern of the circuit body 11 is electrically connected to the one ends of the electric wires 21 of the wire harness 20 through the connecting parts 12. However, the power line pattern, the GND line pattern or the signal line pattern of the circuit body 11 may be directly connected to the one ends of the electric wires 21 of the wire harness 20 by soldering. What is important is that the power line pattern, the GND line pattern or the signal line pattern of the circuit body 11 is electrically connected to the one ends of the electric wires 21 of the wire harness 20 and the connecting parts of the power line pattern, the GND line pattern or the signal line pattern and the one ends of the electric wires 21 of the wire harness 20 may have such sizes so as not to give an influence to the form of the sealing member 13 for sealing the circuit body 11.

Second Exemplary Embodiment

When the ECU is installed in a vehicle, the ECU needs to be fixed to some place. Thus, an exclusive fixing member such as a bracket that is usually prepared as a separate member is employed to fix the ECU by using screws or the like.

When the bracket is used, a member for attaching the bracket is ordinarily necessary in the ECU side so that the structure of the ECU is complicated and enlarged. Further, a part for attaching the bracket needs to have a prescribed strength.

In the present invention, are provided simple structures of a second exemplary embodiment to a fifth exemplary embodiment shown in FIGS. 2A to 6 in which the structure of a case is not complicated by using a fixing unit which does not require a high strength to the case.

Initially, the second exemplary embodiment of the present invention will be described below. In this exemplary embodiment, the same parts as those of the first exemplary embodiment are designated by the same reference numerals to avoid a duplicated explanation.

Figure 2A:
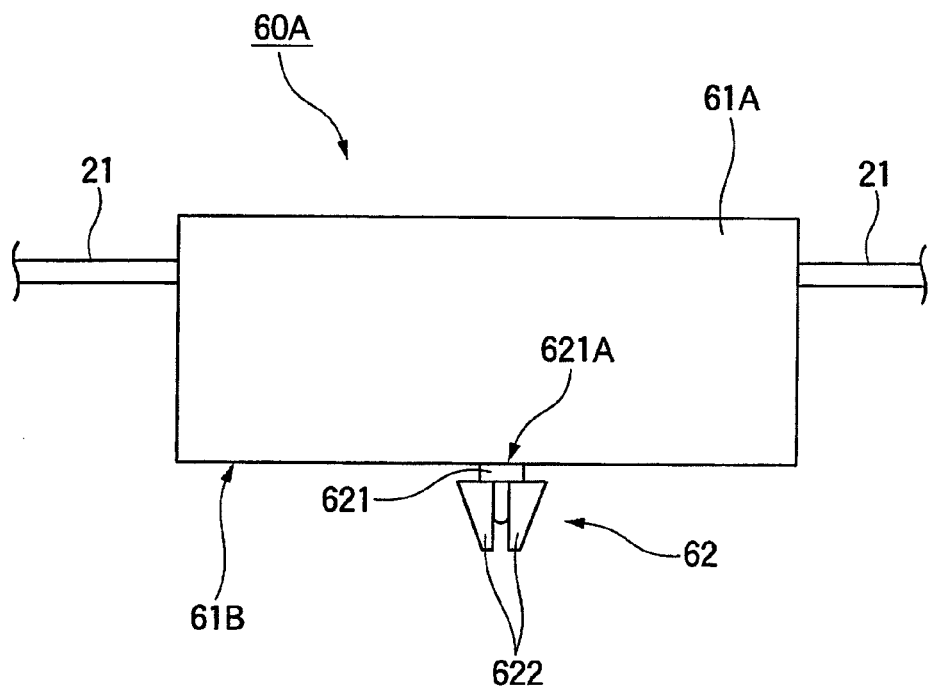
FIG. 2A is a side view showing a wire harness and an ECU according to a second exemplary embodiment of the present invention.
Figure 2B:
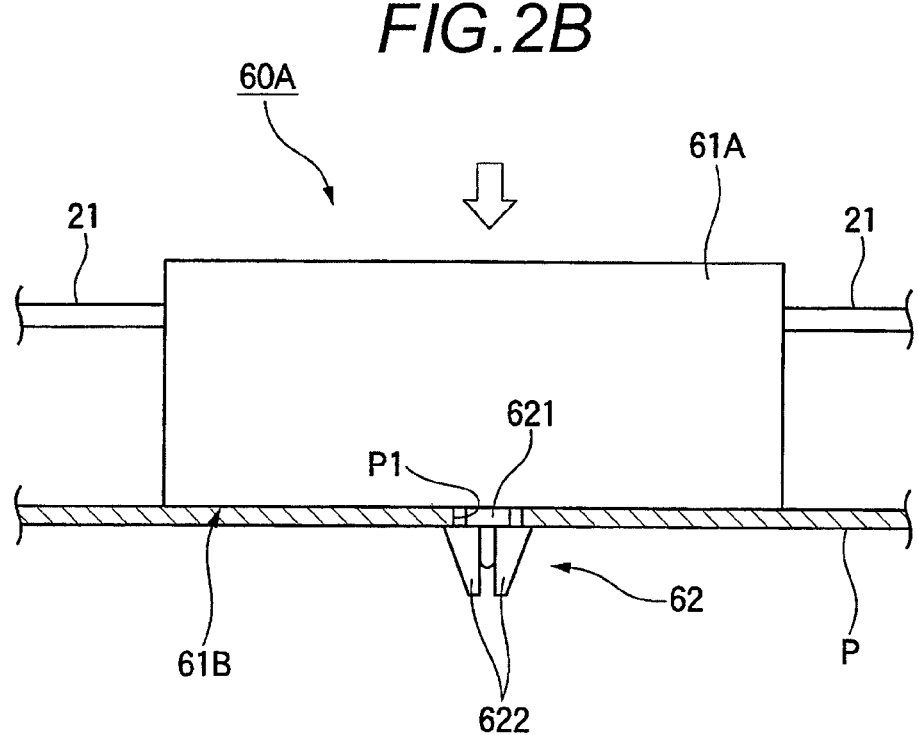
FIG. 2B is an explanatory view showing a state that the ECU is fixed to a vehicle side.

FIGS. 2A and 2B show a wire harness (a part thereof) of the present exemplary embodiment and an ECU 60A connected thereto. In this exemplary embodiment, to a part of a sealing member (refer it to as a "casing", hereinafter) 61A of the ECU 60A connected to one ends of an electric wire 21, a clip 61 is fixed.

Also in the ECU 60A of the present exemplary embodiment, a circuit body and connecting parts (members for electrically connecting the one ends of the electric wire 21 of the wire harness to a power line pattern, a GND line pattern or a signal line pattern of the circuit body), both of which are not shown in the drawing, are provided similarly to the first exemplary embodiment in addition to the casing 61A.

The casing 61A has a substantially parallelepiped form and the above-described clip 62 is attached to one surface thereof (a part of a bottom surface 61B in FIG. 2B).

The clip 62 forms the fixing unit that is pushed in and attached to an attaching hole P1 provided in a panel P of a part of the vehicle as a member to be fixed. The clip includes a shaft member 621 of a base end side and a substantially umbrella-shaped engaging piece 622 protruding from the shaft member 621 so as to be expanded outward.

The shaft member 621 of the clip 62 is stuck to one surface 61B of the casing 61A by using a fixing force of the casing 61A during a molding process. As described above, the shaft member 621 is attached to the casing 61 by using the fixing force of the casing 61A during the molding process. Thus, since a worker does not need to separately carry out a clip attaching operation as in a usual device, workability can be improved. The engaging piece 622 has a substantially conical form with an end recessed, is deformable in a contracting direction and can be opened to an original state by a restoring force (or a resiliency) after the engaging piece 622 passes the attaching hole P1.

Thus, according to the present exemplary embodiment, as shown in FIG. 2B, when the casing 61A is pushed into the attaching hole P1 provided in a part of the panel P, the engaging piece 622 passing through the attaching hole P1 is expanded to the original state and engaged on an opposite surface of the panel P, so that the casing 61A can be simply fixed to the panel P.

Figure 3A:
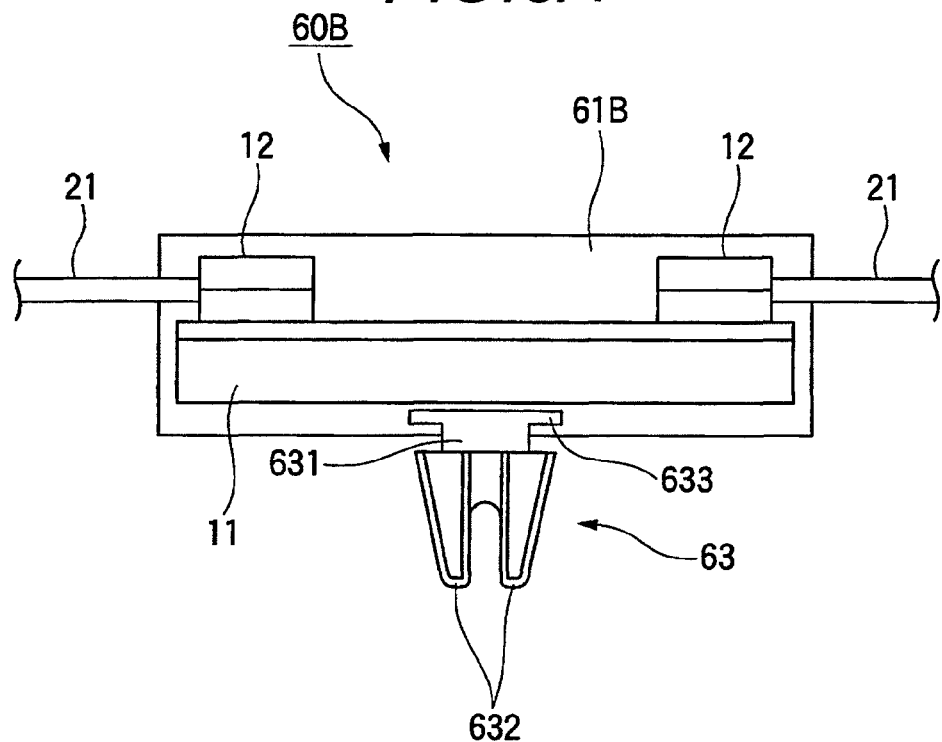
FIG. 3A is a structural diagram showing a wire harness and an ECU according to a modified example of the second exemplary embodiment of the present invention.
Figure 3B:
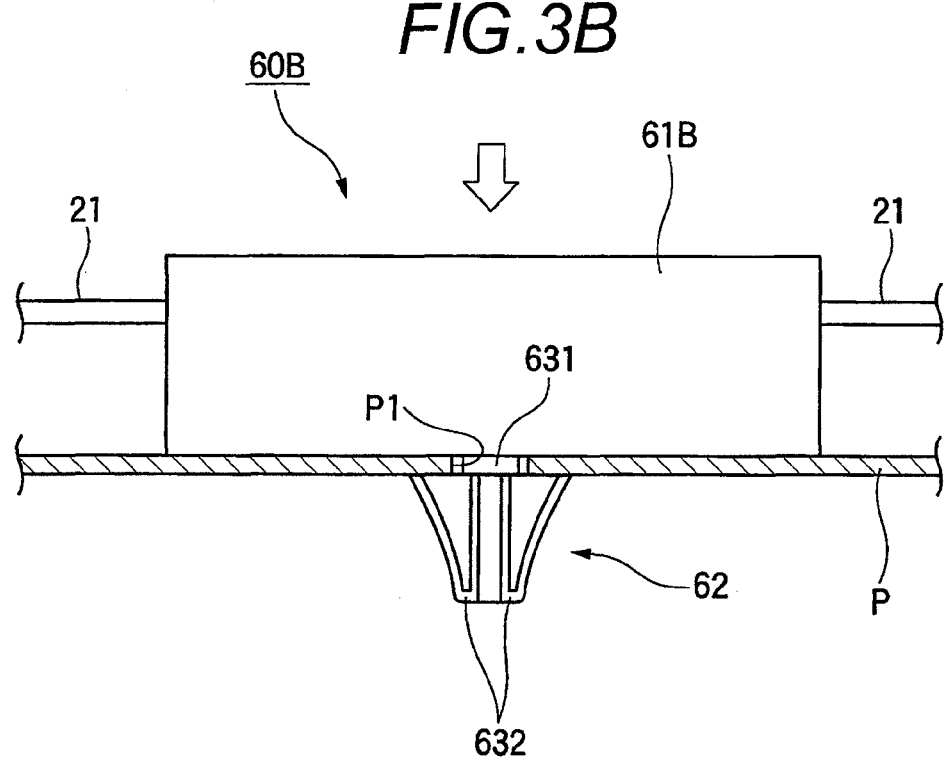
FIG. 3B is an explanatory view showing a state that the ECU is fixed to a vehicle side.

In the present exemplary embodiment, a base end face 621A of the shaft member 621 of the clip 62 is stuck to the one surface 61B to fix the clip 62 to the casing 61A. However, the present invention may employ such a structure as shown in FIGS. 3A and 3B as well as the above-described structure. Namely, a clip 63 may be used that has a leg part 633 provided in a base end. When a casing 61B of an ECU 60B is molded, for instance, during a molding process, the leg part 633 may be integrally solidified by a resin and attached to the casing 61B (that is, the leg part 633 is buried in the casing 61B). As shown in FIGS. 3A and 3B, a shaft member 631 and an engaging part 632 are provided.

Third Exemplary Embodiment

Now, a third exemplary embodiment of the present invention will be described below by referring to the drawings. In this exemplary embodiment, the same parts as those of the first and second exemplary embodiments are designated by the same reference numerals to avoid a duplicated explanation.

Figure 4A:
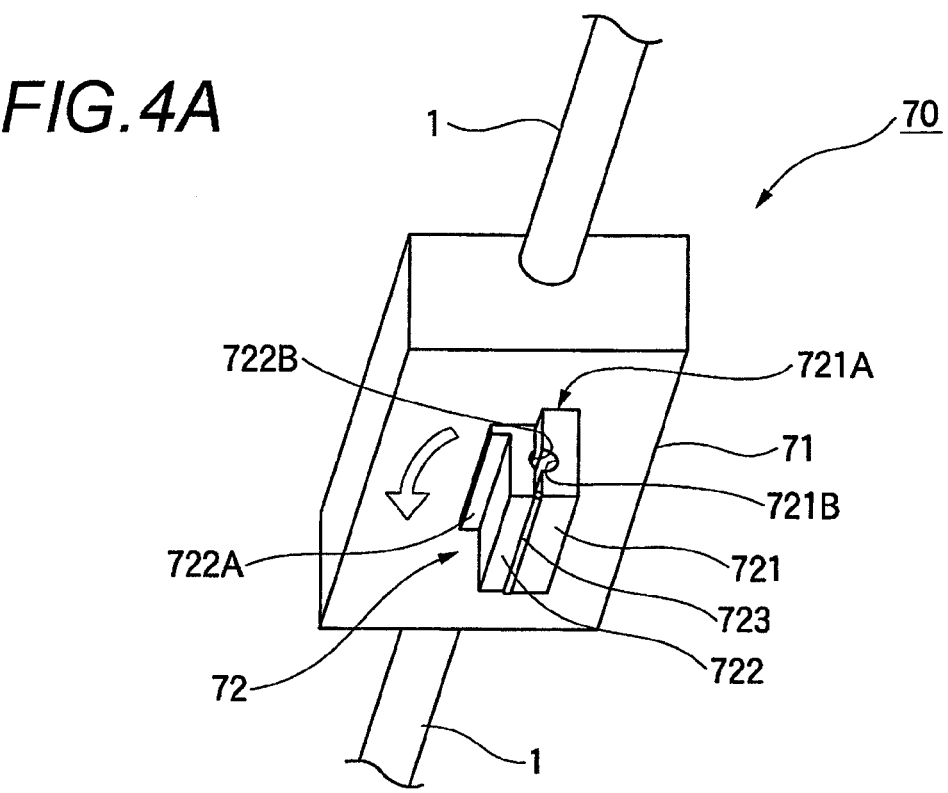
FIG. 4A is a perspective view showing a wire harness and an ECU according to a third exemplary embodiment of the present invention.
Figure 4B:
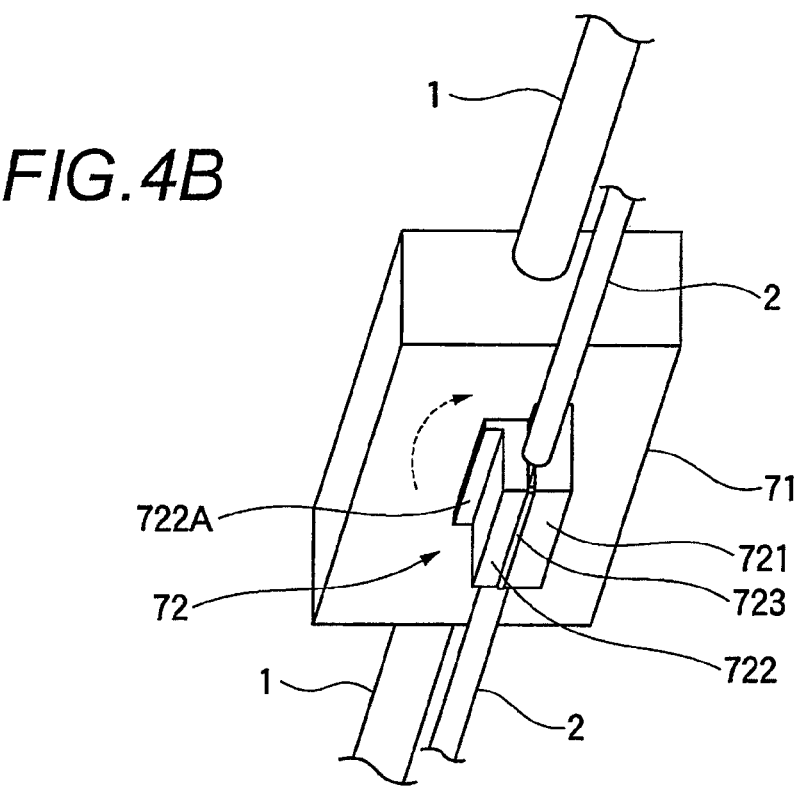
FIG. 4B is a perspective view showing a state that a branch line is supported by the ECU.

FIGS. 4A and 4B show a part of a wire harness according to the present exemplary embodiment and an ECU 70 connected thereto. In the present exemplary embodiment, to a part of a sealing member (refer it to as a "casing", hereinafter) 71 of the ECU 70 connected to one ends of a trunk line 1 having a plurality of electric wires twisted, a clamp 72 is fixed for holding another electric wire (refer it to as a branch line, hereinafter) 2.

The clamp 72 serves as a holding member for holding another electric wire which differs from the electric wire connected to the ECU 70 and includes a main body part 721, an opening and closing part 722 and a hinge part 723 for connecting them so as to freely open and close.

The main body part 721 of the present exemplary embodiment has a substantially parallelepiped form. One surface (an upper surface in FIG. 4A) 721A is stuck to the casing 71 by using a fixing force of the casing 71 during a molding process. On a surface opposed to the opening and closing part 722, a groove 721B having a substantially circular arc shape in section is formed to hold the branch line 2. As described above, the main body part 721 is attached to the casing 71 by using the fixing force of the casing 71 during the molding process. Thus, a worker does not need to separately carry out a clamp attaching operation as in a usual device, so that workability can be improved.

The opening and closing part 722 is connected to the main body part 721 by the hinge part 723 so that the opening and closing part 722 can rotate on the hinge part 723. Further, in the opening and closing part 722, a protrusion 722A that is engaged with a finger (or other suitable jig or the like) for an opening operation is formed in an upper side (an upper part in FIG. 4A) forming an opening part of the clamp 72. Also on a surface of the opening and closing part 722 opposed to the main body part 721, a small groove 722B having a substantially circular arc shape in section is formed.

The hinge part 723 is provided with a torsion spring to constantly urge a rotating elastic force (a clockwise direction in FIG. 4B) directed toward the main body part 721 to the opening and closing part 722 so as to close the opening and closing part 722.

Therefore, according to the present exemplary embodiment, for instance, when the protrusion 722A on the upper part of the opening and closing part 722 is engaged with the finger to open the opening and closing part counterclockwise (see FIG. 4A) against the elastic force, the branch line 2 different from the main line 1 may be sandwiched and held integrally between the opening and closing part 722 and the main body part 721.

In the present exemplary embodiment, the one surface 721A of the clamp 72 is stuck to the casing 71 by using the fixing force of the casing 71 during the molding process, however, when the casing 71 is molded with a resin, a base end of the main body part 721 near the opening part may be molded integrally with the casing 71 (that is, the base end is buried in the casing 71).

Further, in the present exemplary embodiment, only the clamp 72 is fixed to the casing 71, however, such a clip as shown in FIGS. 2A, 2B, 3A and 3B may be further attached to another surface than the attaching surface of the clamp 72.

Fourth Exemplary Embodiment

Now, a fourth exemplary embodiment of the present invention will be described below by referring to the drawings. In this exemplary embodiment, the same parts as those of the first to third exemplary embodiments are designated by the same reference numerals to avoid a duplicated explanation.

Figure 5:
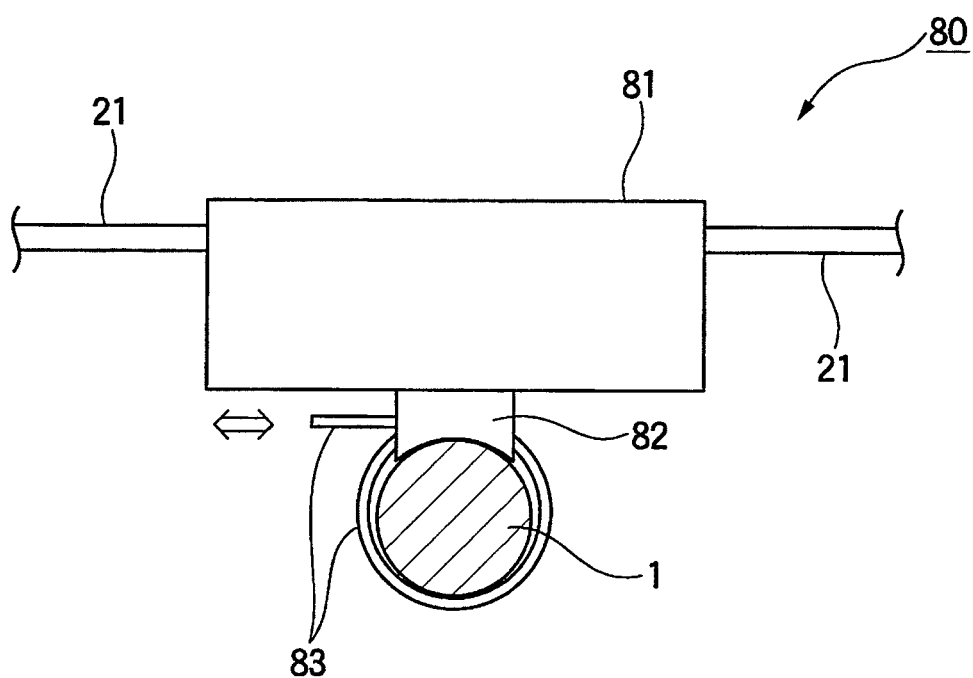
FIG. 5 is a side view showing a wire harness and an ECU according to a fourth exemplary embodiment of the present invention.

FIG. 5 shows a part of a wire harness according to the present exemplary embodiment and an ECU 80 connected thereto. In the present exemplary embodiment, to one surface of a sealing member (refer it to as a "casing", hereinafter) 81 of the ECU 80 connected to an electric wire 21, a bracket 82 is stuck by using a fixing force of the casing 81 during a molding process and a binding band 83 is attached to the bracket 82.

The bracket 82 of the present exemplary embodiment is provided with a band hole (not shown in the drawing) into which the binding band 83 is inserted. Further, an engaging unit (not shown in the drawing) such as a protrusion or a pawl with which the inserted binding band 83 having a prescribed length is engaged is formed in the band hole.

The binding band 83 serves to fix and hold electric wires having various kinds of dimensions of outside diameters such as a trunk line 1 formed by twisting a plurality of electric wires or a single electric wire. The electric wire as an object to be held (the trunk line 1 in the present exemplary embodiment) is inserted into the binding band rounded in a substantially circular shape, tightly fastened thereby and engaged by the engaging unit provided in the band hole.

Thus, according to the present exemplary embodiment, the electric wires having the various kinds of outside diameters can be freely and simply fixed and held.

In the present exemplary embodiment, the bracket 82 is stuck to the one surface of the casing 81 by using the fixing force of the casing 81 during the molding process as in the third exemplary embodiment, however, when the casing 81 is molded with a resin, a base end side of the bracket 82 may be molded integrally with the casing 81 under a state that the ban hole is left (that is, the base end side is buried in the casing 81).

Further, in the present exemplary embodiment, the bracket 82 is fixed to the casing 81, however, such a clip as shown in FIGS. 2A, 2B, 3A and 3B may be further attached to another surface than the attaching surface of the bracket 82.

Fifth Exemplary Embodiment

Now, a fifth exemplary embodiment of the present invention will be described below by referring to the drawings. In this exemplary embodiment, the same parts as those of the first to fourth exemplary embodiments are designated by the same reference numerals to avoid a duplicated explanation.

Figure 6:
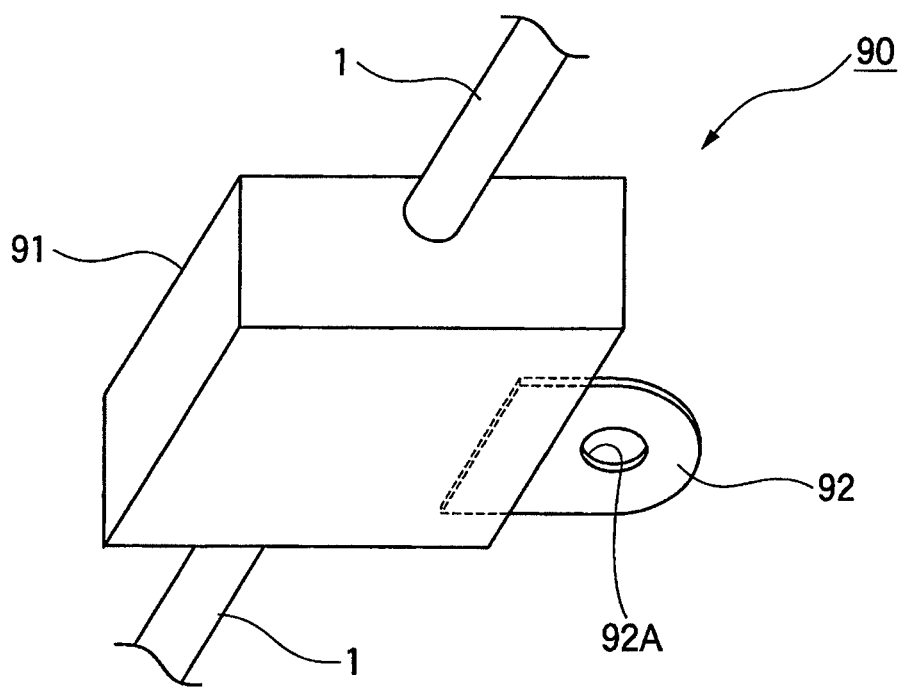
FIG. 6 is a perspective view showing a wire harness and an ECU according to a fifth exemplary embodiment of the present invention.

FIG. 6 shows a part of a wire harness according to the present exemplary embodiment and an ECU 90 connected thereto. In the present exemplary embodiment, to a part of a sealing member (refer it to as a "casing", hereinafter) 91 of the ECU 90 connected to one ends of a trunk line 1 formed by twisting a plurality of electric wires, a disk-shaped bracket 92 is stuck integrally to the casing 91 by molding.

The bracket 92 is provided with a hole 92A for inserting a screw and is screwed to a suitable part such as a panel of a vehicle side as a member to be fixed by the screw or the like.

Therefore, according to the present exemplary embodiment, the casing 91 of the ECU 90 can be simply screwed, by the use of the hole 92A of the bracket 92, to a tapped hole provided in the suitable part such as the panel of the vehicle side by the screw or the like.

Further, in the present exemplary embodiment, the bracket 92 is fixed to the casing 91, however, such a clip as shown in FIGS. 2A, 2B, 3A and 3B may be further attached to another surface than the attaching surface of the bracket 92.

Sixth Exemplary Embodiment

Figure 12:
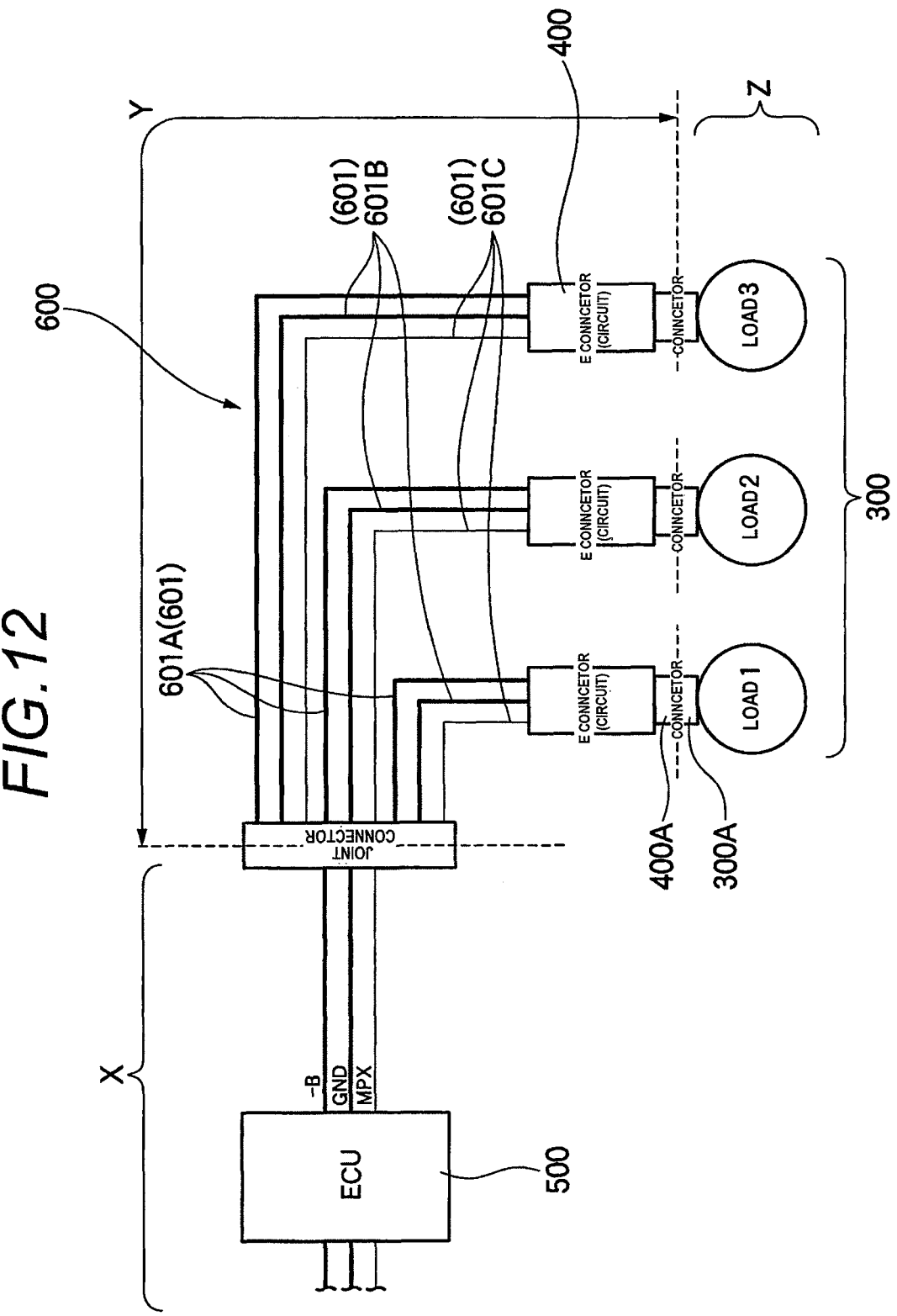
FIG. 12 is an explanatory view showing an electric connection between the usual ECU and electrical equipments.

In an ECU prior to the ECU of a usual example described in the "Background Art", one central ECU concentrically controls a plurality of loads. However, from a conception that a burden is concentrated on the ECU, as shown in FIG. 12, a circuit body is connected to an electric wire side connector 400A fitted to a load side connector 300A to be connected to electrical equipments (a load side device) 300 so that a control is assigned to an ECU 500 and the circuit body. The electric wire side connector 400A having the circuit body is called an "E connector".

The E connector 400 includes the circuit body and a casing that accommodates the circuit body therein. To a first terminal of the circuit body, one end of an electric wire 601 of a wire harness 600 is connected. The electric wire side connector 400A connected to a second terminal of the circuit body that can be fitted to the load side connector 300A formed in the electrical equipments (the load side device) 300 to be controlled is formed in the casing.

In the circuit diagram of the usual example, the diameters of electric wires of a power line 601A and a GND line 601B extending from the ECU 500 to the E connector 400 need to be thick by considering grounding (a short-circuit to GND) (thick lines in the circuit diagram). Especially, as shown in FIG. 12, in the E connector 400 fitted to the load side connector 300A, the diameters of the electric wires of the power line 601A and the GND line 601B extending from the ECU 500 to the E connector 400 need to be thick. Therefore, a problem arises that the weight of the electric wires is increased and a cost is increased. However, since a large current does not need to be supplied to a signal line, the diameter of an electric wire may be smaller than that of the power line 601A and the GND line 601B.

Thus, a below-described ECU system is invented in which an ECU is connected to electrical equipments by a wire harness.

Figure 7:
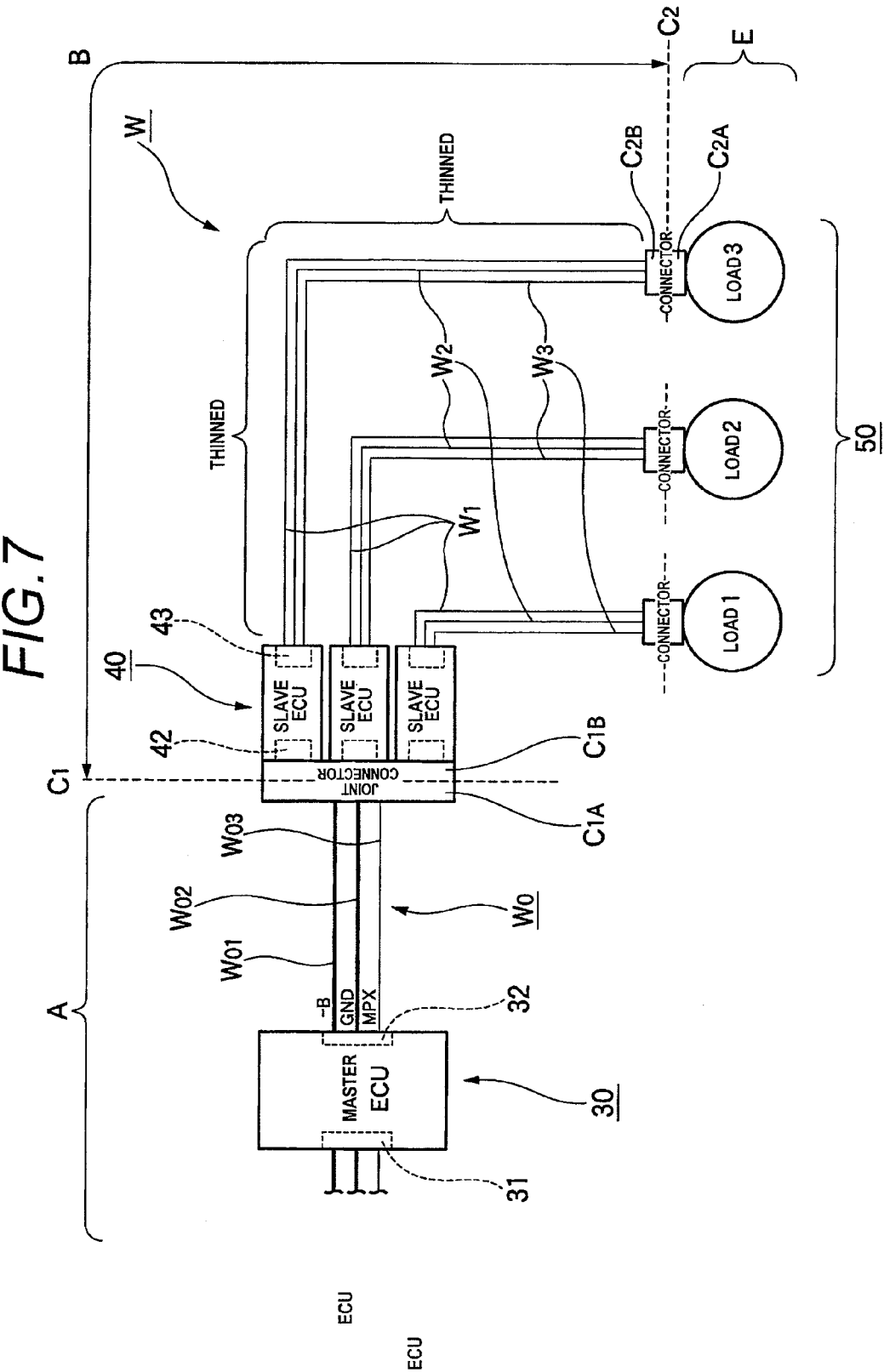
FIG. 7 is an explanatory view showing an electric connection structure of an ECU system according to a sixth embodiment of the present invention.

The ECU system of the present exemplary embodiment includes, as shown in FIG. 7, a master ECU 30, slave ECUs 40 of the same number provided correspondingly to below-described electrical equipments 50 and the electrical equipments 50. The three kinds of electric parts are respectively electrically and detachably connected together by a below-described first wire harness $W_0$ and a second wire harness W.

The master ECU 30 is connected to the slave ECUs 40 through electric wires $W_{01}$ to $W_{03}$ of the first wire harness $W_0$ and a first connector $C_1$. On the other hand, the slave ECUs 40 are connected to the electrical equipments 50 through electric wires W1 to W3 of the second wire harness W and a second connector $C_2$.

The master ECU 30 has the structure described in the first exemplary embodiment. Namely, the master ECU 30 includes a master circuit body, a first master connecting part 31 and a second master connecting part 32 directly attached to a power line pattern, a GND line pattern or a signal line pattern of the master circuit body and a sealing member that seals integrally the master circuit body, the first master connecting part 31 and the second master connecting part 32. In this structure, a part designated by reference character A in FIG. 7 (the master ECU 30 and the wire harness having one ends of the electric wires connected to the master ECU 30) is physically formed integrally.

The first master connecting part 31 is electrically connected to a battery as a power device (not shown in the drawing) through electric wires of the wire harness (only partly shown).

Since the one ends of the electric wires $W_{01}$ to $W_{03}$ of the first wire harness $W_0$ are respectively electrically connected to the second master connecting part 32, the one ends of the electric wires $W_{01}$ to $W_{03}$ of the first wire harness $W_0$ are respectively electrically connected to the power line pattern, the GND line pattern or the signal line pattern of the master circuit body through the second master connecting part 32. Further, to the other ends of the electric wires $W_{01}$ to $W_{03}$ of the first wire harness $W_0$ respectively, a joint connector $C_{1A}$ forming one of the first connector $C_1$ (a connector of a male side or a female side) is attached. $W_{01}$ designates the power line, $W_02$ designates the GND line and $W_{03}$ designates the signal line.

The slave ECUs 40 are provided between the master ECU 30 and the electrical equipments 50, electrically connected to the master ECU 30 through the electric wires of the first wire harness $W_0$ and electrically connected to the electrical equipments 50 through the electric wires of the second wire harness W. As for the specific structure of a main part of the ECU 40 (a main body part including a circuit body 11 that is coated with a sealing member), in the ECU 10 shown in FIG. 1, to one connecting part (for instance, to the connecting part 12 in a left side), a below-described joint connector $C_{1B}$ is electrically connected. To the other connecting part (for instance, to the connecting part 12 in a right side), the electric wire of the second wire harness W is connector. The joint connector $C_{1B}$ and the slave ECU 40 are coated with the sealing member.

Figure 8:
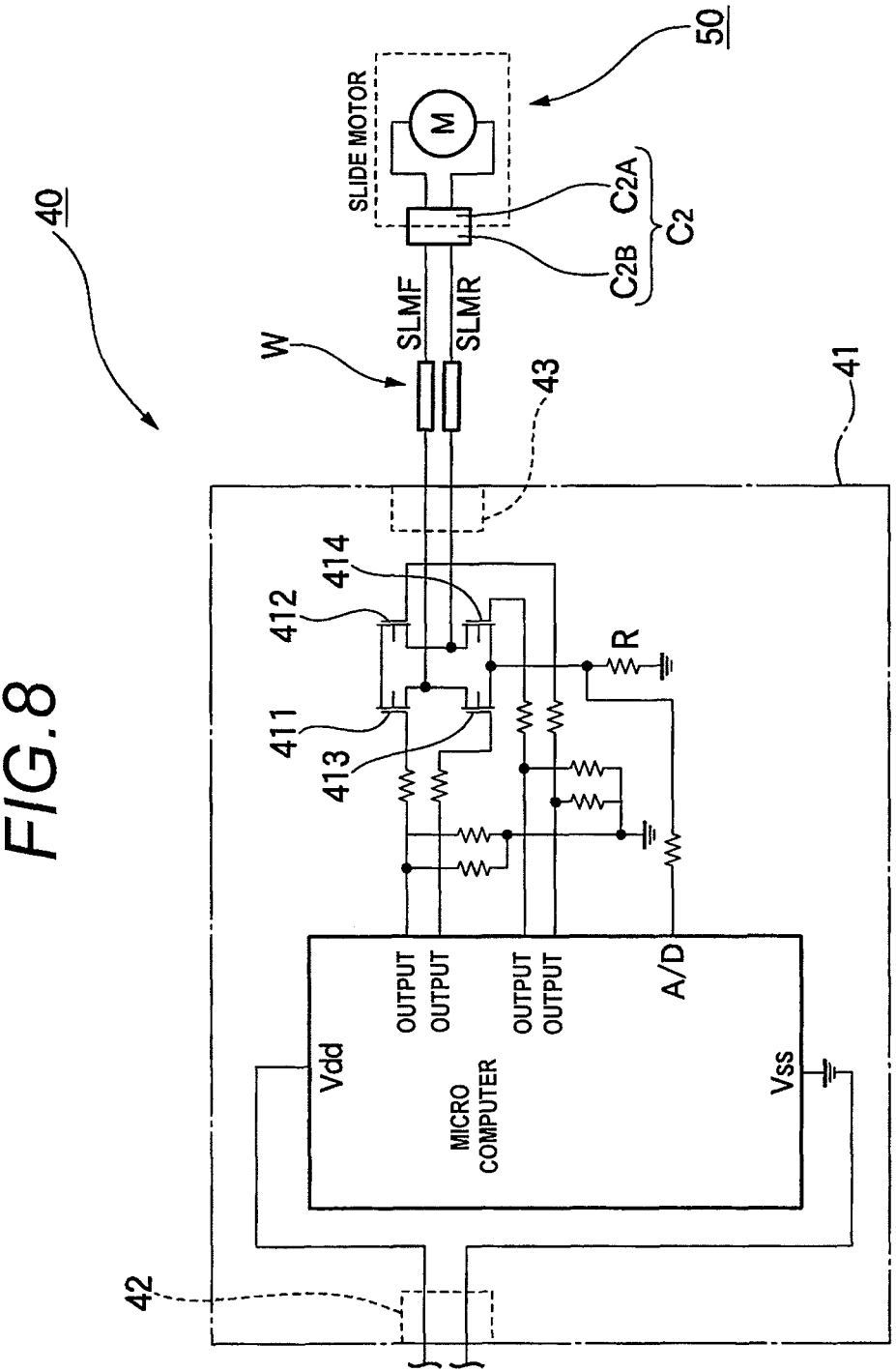
FIG. 8 is a wiring diagram showing an inner part of a slave circuit body of a slave ECU of the sixth embodiment.

Each slave ECU 40 of the present exemplary embodiment includes, as shown in FIG. 8, a slave circuit body 41, a first slave connecting part 42 directly attached to the slave circuit body 41 for electrically connecting a power line pattern, a GND line pattern or a signal line pattern of the slave circuit body 41 to the electric wires $W_{01}$ to $W_{03}$ of the first wire harness $W_0$, a second slave connecting part 43 directly attached to the slave circuit body 41 for electrically connecting the power line pattern, the GND line pattern or the signal line pattern of the slave circuit body 41 to the electric wires $W_1$ to $W_3$ of the second wire harness W and a sealing member that seals together the slave circuit body 41, the first slave connecting part 42 and the second slave connecting part 43. A state that the slave circuit body 41, the first slave connecting part 42 and the second slave connecting part 43 are coated with the sealing member is the same as that shown in FIG. 1. In this structure, a part shown by reference character B in FIG. 7 (the joint connector $C_{1B}$, the slave ECUs 40 and the second wire harness W having the one ends of the electric wires connected to the slave ECUs 40) is physically formed integrally. The joint connector $C_{1B}$ is electrically connected to the first slave connecting part 42 so that the joint connector $C_{1B}$ is formed integrally with the first slave connecting part 42. A part of the joint connector $C_{1B}$ from which a below-described fitted part to the joint connector $C_{1A}$ is removed is coated with the sealing member.

In the slave circuit body 41, a DC resistance R (see FIG. 8) is provided as a current limiter that lowers a current value of a current supplied through the electric wire $W_{01}$ of the first wire harness $W_0$ from the master ECU 30 to supply the current to the electrical equipment 50 through the electric wire $W_1$ of the second wire harness W. When the DC resistance R (see FIG. 8) is provided, since the upper limit value of the current supplied in the electric wire $W_1$ of the second wire harness W extending from the slave ECU 40 to the electrical equipment 50 can be limited, the electric wire $W_1$ of the second wire harness W may be thinner than the electric wire $W_{01}$ of the first wire harness Wo. Further, the GND line $W_2$ of the wire harness W that needs to be thick by considering grounding (a short-circuit to GND) may be similarly thinner than the GND line $W_{02}$ of the first wire harness $W_0$. Further, as shown in FIG. 8, the slave circuit body 41 includes four FETs 411 to 414 as switching units to switch the value of the current outputted to the electrical equipment 50 by the switching units FETs 411 to 414.

To the first connecting part 42 directly attached to the slave circuit body 41, the joint connector $C_{1B}$ detachably attached to the joint connector $C_{1A}$ is attached to realize an electric connection to the joint connector $C_{1A}$ forming one side of the first connector $C_1$ (the connector of the male side or the female side). The joint connector $C_{1B}$ is electrically connected to the first slave connecting part 42 so that the joint connector $C_{1B}$ is formed integrally with the first slave connecting part 42. The part of the joint connector $C_{1B}$ except the fitted part to the joint connector $C_{1A}$ (at least an opening part which allows the joint connector $C_{1B}$ to be fitted to the joint connector $C_{1A}$) is coated with the sealing member. In the sixth exemplary embodiment, in the slave ECU 40, a structure that the joint connector $C_{1B}$ and the slave circuit body 41 are coated with the sealing member is described. However, when the joint connector $C_{1A}$ and the joint connector $C_{1B}$ are not used, the electric wires $W_{01}$ to $W_{03}$ of the first wire harness $W_0$ are allowed to branch and connected to the first slave connecting parts 42 of a plurality of slave circuit bodies 41 respectively and the slave circuit bodies 41 are respectively coated with the sealing member.

Figure 9:
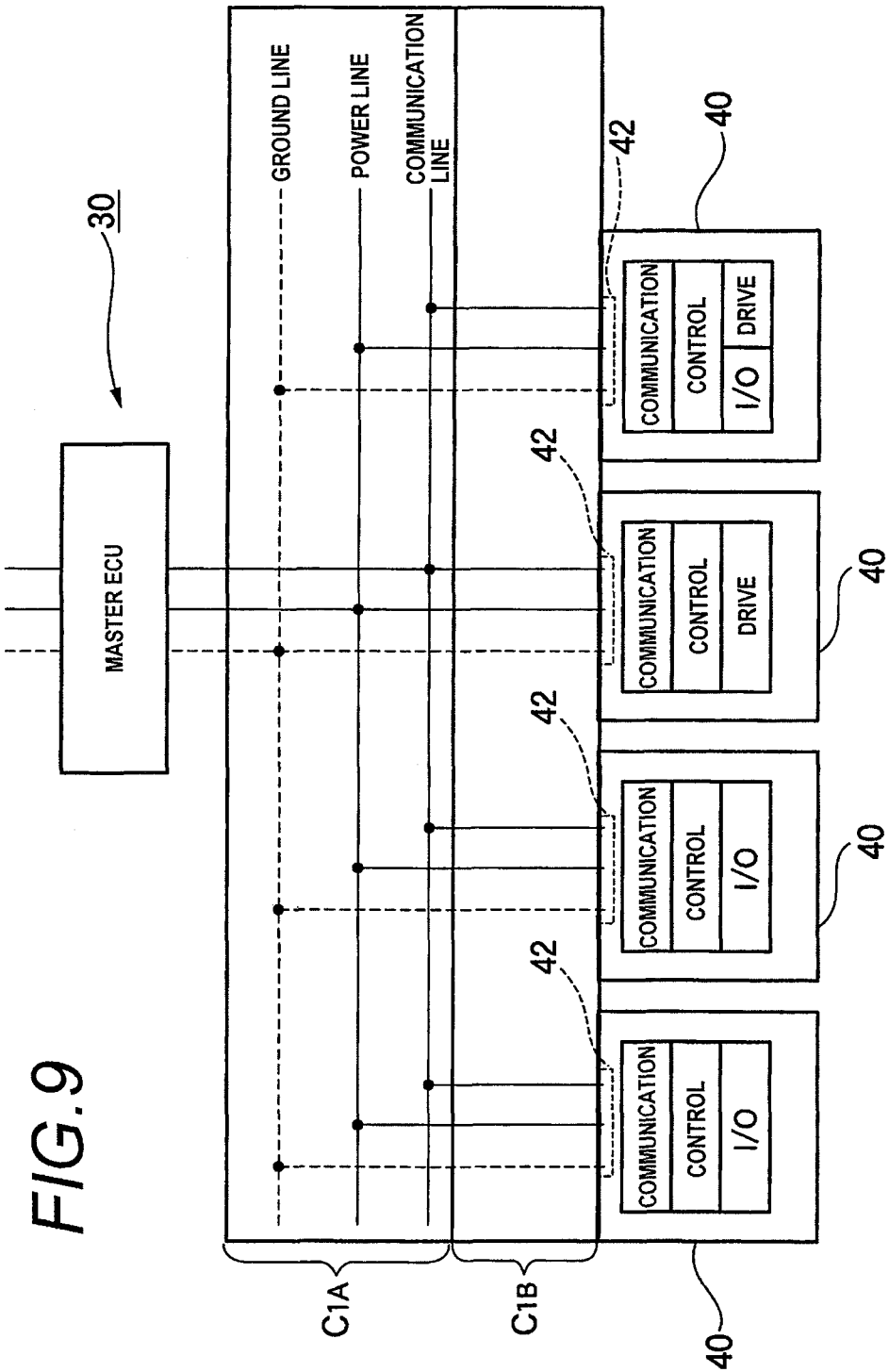
FIG. 9 is an explanatory view showing an electric connection structure of the ECU system according to the sixth embodiment of the present invention.

The first connector $C_1$ includes, as described above, the joint connector $C_{1A}$ and the joint connector $C_{1B}$ detachably attached thereto. Namely, the joint connectors $C_{1A}$ and $C_{1B}$ are gathered as one member and formed integrally for each joint connector, so that the joint connectors $C_{1A}$ and $C_{1B}$ may be connected together at the same time at one touch (Namely, one master ECU 30 can be connected to the plurality of slave ECUs 40 by a manual operation for fitting once the joint connector $C_{1A}$ to the joint connector $C_{1B}$). In the first joint connector $C_1$ including the joint connector $C_{1A}$ (the connector of the male side or the female side) and the joint connector $C_{1B}$ (the connector of the female side or the male side), the wiring of the electric wires therein is arranged as shown in FIG. 9. Namely, in the joint connector $C_{1A}$, the electric wires $W_{01}$ to $W_{03}$ of the first wire harness $W_0$ extending from the master ECU 30 are allowed to branch and directed to the joint connector $C_{1B}$. In the joint connector $C_{1B}$, the electric wires $W_{01}$ to $W_{03}$ of the first wire harness $W_0$ extending from the joint connector $C_{1A}$ are electrically connected to the first slave connecting parts 42.

On the other hand, in the other ends of the electric wires $W_1$ to $W_3$ of the second wire harness W having one ends connected to the second slave connecting part 43, a connector $C_{2B}$ is provided that forms one side (a connector of a male side or a female side) of the second connector $C_2$ to individually realize an electric connection to each electrical equipment 50.

In each of the electrical equipments 50, a joint connector $C_{2A}$ forming the other side (a connector of a female side or a male side) of the second connector $C_2$ is provided to detachably and electrically connect the joint connector $C_{2A}$ to the joint connector $C_{2B}$ provided in the other ends of the electric wires $W_1$ to $W_3$ the second wire harness W. A part shown by reference character E in FIG. 7 is physically integrally formed.

Therefore, according to the present exemplary embodiment, the slave ECU 40 is arranged between the master ECU 30 and the electrical equipment 50 and the current limiter (the DC resistance R in FIG. 8) is provided for limiting the current in the slave circuit body 41 of the slave ECU 40. Accordingly, when the current not smaller than an amount of current necessary for the electrical equipment 50 connected to the slave ECU 40 is supplied to the electrical equipment 50 from the master ECU 30, the current is limited to the amount of current required for the electrical equipment 50 by the slave ECU 40, and then, supplied to the electrical equipment 50. As a result, the diameter of each of the electric wires from the slave ECU 40 to the electrical equipment 50 may be set to the diameter of an electric wire meeting a current value necessary for the electrical equipment 50 (namely, the diameter of the electric wire does not need to be set to a diameter of an electric wire meeting the current value when the current is supplied to all loads at the same time by considering grounding). The electric wires extending from the slave ECU 40 to the electrical equipment 50 may be thinned.

Further, in the ECU system of the present invention, since the electric wires are thinned, the weight is the more reduced. Further, in the slave ECU 40, since the slave circuit body 40, the first slave connecting part 42 and the second slave connecting part 43 are coated together with the sealing member not shown in the drawing, the durability of the ECU 40 to an external impact can be ensured like the ECU 10 according to the first exemplary embodiment. Therefore, the ECU system of the present invention in which the slave ECU 40 is connected to the electric wires of the second wire harness W may be treated without requiring a careful treatment as in the usual device in which the wire harness is disorderly treated. Namely, a worker does not need to consider a treatment to the slave e ECU 40 and may treat the slave ECU 40 like the treatment of the wire harness W to the end.

Seventh Exemplary Embodiment

Now, a seventh exemplary embodiment of the present invention will be described below. In the present exemplary embodiment, the same parts as those of the sixth exemplary embodiment are designated by the same reference numerals to avoid a duplicated explanation.

Figure 10:
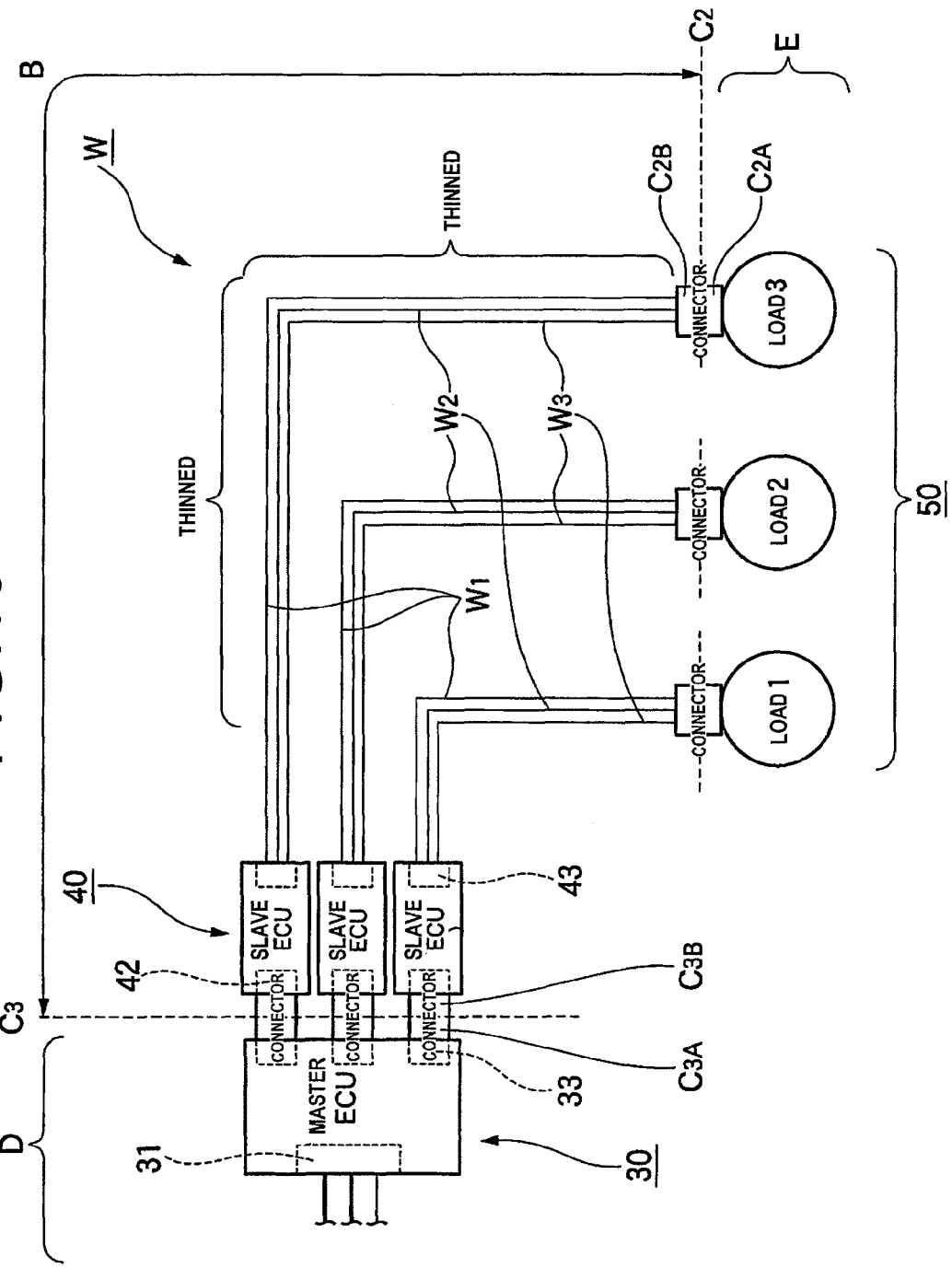
FIG. 10 is an explanatory view showing a modified example of an electric structure of an ECU system according to a seventh exemplary embodiment of the present invention.

An ECU system of the present exemplary embodiment shown in FIG. 10 is different from the sixth embodiment shown in FIG. 7 from the viewpoint that a master ECU 30 is directly connected to slave ECUs 40 respectively by a third connector $C_3$ without interposing electric wires $W_{01}$ to $W_{03}$ of a first wire harness $W_0$ as in the sixth exemplary embodiment so as to be individually detachably attached.

Further, the present exemplary embodiment is different from the ECU system of the sixth exemplary embodiment shown in FIG. 7 that uses the joint connector $C_{1A}$ to which the one ends of the electric wires $W_{01}$ to $W_{03}$ of the first wire harness $W_0$ are respectively electrically connected. In the present exemplary embodiment, in the master ECU 30, second connecting parts 33 of the same number as that of electrical equipments 50 are formed and connectors $C_{3A}$ (connectors of a female side or a male side) forming one of the third connector $C_3$ and having the same number as that of the installed electrical equipments 50 are electrically connected to the second master connecting parts 33 of the master ECU 30.

Further, in the ECU system of the sixth exemplary embodiment, to the first slave connecting part 42 of each of the slaves ECU 40 shown in FIG. 7, the joint connector $C_{1B}$ (the connector of the male side or the female side) forming one of the first connector $C_1$ is attached. However, in the present exemplary embodiment, an individual connector $C_{3B}$ (a connector of a male side or a female side) is electrically connected to a first slave connecting part 42 for each slave ECU 40.

As described above, in the present exemplary embodiment, the master ECU 30 is individually connected to the slave ECUs 40 respectively by connectors $C_{3A}$ electrically connected to the second master connecting parts 32 of the master ECU 30 and the connectors $C_{3B}$ electrically connected to the first slave connecting parts 42 of the slave ECUs 40. Thus, an electric connection between a battery and the electrical equipments 50 is realized.

In the present invention, it is to be understood that the master ECU and the slave ECUs in the sixth embodiment and the seventh embodiment may be provided with such a clip, a clamp, a bracket or a binding band as described in the second exemplary embodiment to the fifth exemplary embodiment shown in FIGS. 2A to 6.

What is claimed is:

1. A wire harness, comprising:
   one or more electric wires; and
   an ECU which includes a circuit body electrically connected to one ends of the one or more electric wires and a sealing member that seals the circuit body and the one ends of the one or more electric wires,
   wherein the one ends of the one or more electric wires are electrically connected to at least one of a power line pattern, a GND line pattern and a signal line pattern of the circuit body.

2. The wire harness according to claim 1, wherein the ECU further includes a connecting part electrically connected to the one or more electric wire and sealed with the sealing member.

3. The wire harness according to claim 2, wherein the circuit body and the connecting part are entirely sealed and coated with the sealing member, and the one or more electric wires protrude from an inside of the sealing member.

4. The wire harness according to claim 1, wherein the ECU includes a fixing unit for fixing the ECU to a member to be fixed, the fixing unit sealed with the sealing member.

5. The wire harness according to claim 4, wherein the fixing unit has first a part sealed with the sealing member and a second part protruded from an inside of the sealing member.

6. The wire harness according to claim 1, wherein the ECU includes a holding unit for fixing and holding another electric wire which differs from the electric wire, the holding unit sealed with the sealing member.

7. The wire harness according to claim 6, wherein the holding unit has a part sealed with the sealing member and a second part protruded from inside of the sealing member.

8. The wire harness according to claim 1, wherein the circuit body is entirely sealed and coated with the sealing member, and the one or more electric wires protrude from an inside of the sealing member.

9. An ECU system comprising:
   a master ECU;
   a slave ECU electrically connected to the master ECU through an electric wire of a first wire harness; and
   an electrical equipment electrically connected to the slave ECU through an electric wire of a second wire harness,
   wherein the slave ECU includes:
   a slave circuit body;
   a slave sealing member that seals the slave circuit body, one end of the electric wire of the first wire harness and one end of the electric wire of the second wire harness under a state that the one end of the electric wire of the first wire harness and the one end of the electric wire of the second harness are electrically connected to at least one of a power line pattern, a GND line pattern and a signal line pattern of the slave circuit body; and
   a current limiter that lowers a current supplied through the electric wire of the first wire harness from the master ECU to a prescribed current value suitable for the electrical equipment and supplies the lowered current to the electrical equipment through the electric wire of the second wire harness, and
   wherein the electric wire of the first wire harness is smaller in diameter than the electric wire of the second wire harness.

10. The ECU system according to claim 9, wherein the master ECU includes:
    a master circuit body; and a master sealing member that seals the master circuit body and the other end of the electric wire of the first wire harness under a state that the other end of the electric wire of the first wire harness is electrically connected to at least one of a power line pattern, a GND line pattern and a signal line pattern of the master circuit body.

11. The ECU system according to claim 9, wherein the master ECU and/or the slave ECU includes integrally a holding unit that fixes and holds another electric wire which differs from the electric wires of the first and second wire harnesses.

12. The ECU system according to claim 11, wherein the holding unit has a part formed integrally with the master ECU and/or the slave ECU.

13. The ECU system according to claim 9, wherein the master ECU and/or the slave ECU includes integrally a fixing unit that fixes the master ECU and/or the slave ECU to a member to be fixed.

14. The ECU system according to claim 13, wherein the fixing unit has a part formed integrally with the master ECU and/or the slave ECU.

\* \* \* \* \*